United States Patent [19]
Borden

[11] Patent Number: 5,857,119
[45] Date of Patent: *Jan. 5, 1999

[54] OBJECT PHOTOGRAPHER

[76] Inventor: John Borden, 6 Williams St., Cambridge, Mass. 02139

[*] Notice: This patent issued on a continued prosecution application filed under 37 CFR 1.53(d), and is subject to the twenty year patent term provisions of 35 U.S.C. 154(a)(2).

[21] Appl. No.: 760,045

[22] Filed: Dec. 4, 1996

Related U.S. Application Data

[60] Provisional application No. 60/024,901 Aug. 30, 1996.

[51] Int. Cl.$^6$ .................................................. G03B 15/00
[52] U.S. Cl. ............................................. 396/5; 396/428
[58] Field of Search ................................. 354/419, 428, 354/1, 5; 396/1, 5, 419, 428

[56] References Cited

U.S. PATENT DOCUMENTS

| | | | |
|---|---|---|---|
| 3,989,933 | 11/1976 | Inghilleri | 235/151 |
| 4,055,004 | 10/1977 | Chase | 35/12 |
| 4,092,673 | 5/1978 | Adams | 358/183 |
| 4,160,585 | 7/1979 | Keillor | 352/87 |
| 4,174,887 | 11/1979 | Mesney | 352/87 |
| 4,214,823 | 7/1980 | Pritchard | 352/87 |
| 4,283,766 | 8/1981 | Snyder et al. | 364/525 |
| 4,318,605 | 3/1982 | Perisic | 354/293 |
| 4,515,455 | 5/1985 | Northmore | 354/293 |
| 4,729,536 | 3/1988 | Scala | 248/429 |
| 4,847,543 | 7/1989 | Fellinger | 318/628 |
| 5,251,156 | 10/1993 | Heier et al. | 364/559 |
| 5,285,397 | 2/1994 | Heier et al. | 364/559 |
| 5,457,370 | 10/1995 | Edwards | 318/571 |
| 5,463,432 | 10/1995 | Kahn | 352/243 |

OTHER PUBLICATIONS

"MotionControl 3000" product announcement from VR Toolworks, Jun. 23, 1995.

"The Object Maker I," *Peace River Studios, Cambridge, Massachusetts*, pp. 1–2, Advertisement Pamphlet, http://www.tiac.net/users/peaceriv/prsobmkr. html (Jun. 13, 1996).

"Magellan QuickTime®VR Object Rigs and Accessories," *Kadian*, Advertisement Brochure, http://www.kaidan.com.

*Primary Examiner*—David M. Gray
*Attorney, Agent, or Firm*—Hamilton, Brook, Smith & Reynolds, P.C.

[57] ABSTRACT

An object photographer and corresponding method are disclosed that enable the capturing images of an object for later electronic stitching. The photographer has an object stand, which rotates the object to be photographed, and a camera frame, which supports a camera to swing through an arc around the object. To facilitate stitching, the height of the object stand is adjustable so that the object coincides with an axis of rotation of the camera frame. Further, the camera is preferably mounted on an adjustable bracket to enable adjustments in the height of the camera relative to the camera frame. At least one counter weight mechanism is preferably used to balance the camera frame for smooth pivoting motion.

24 Claims, 7 Drawing Sheets

OBJECT PHOTOGRAPHER

RELATED APPLICATIONS

This application claims priority to U.S. Provisional Application No. 60/024,901, filed Aug. 30, 1996, the contents of which is incorporated herein by reference in its entirety.

BACKGROUND OF THE INVENTION

Virtual reality computer applications seek to mimic the sensory experience associated with moving through three dimensional space using only a two dimensional display device. The process requires that displayed images be updated in response to the location or position of a viewer in a defined virtual space. Significant data processing capabilities are required to determine the appropriate displayed images, and large data storage capabilities are necessary to store the images for each potential view.

Although sometimes entirely fanciful, in many applications the displayed images are in whole or in part taken from real world scenes. This is common in applications in which the objective is education. For example, the viewer could be shown scenes from a Roman piazza in order to provide an understanding of day-to-day life in the city. Marketing or advertising applications also draw from this use, showing potential customers the marketed goods in an intended or showroom environment.

Panoramic images provide the continuous scenic backdrop in these applications. Usually these images extend continuously, entirely through 360°. Available software allows discrete images to be converted into the continuous panorama. The process involves rotating a common chemical-film camera around its optical center or nodal point. During the rotation, a series of overlapping photographs are taken. Rotation about the optical center ensures that perspective does not change from photograph to photograph. Thus, common portions of the panorama in successive photographs should perfectly match-up. U.S. patent application No. 08/577,292, filed on Dec. 22, 1995 by the present inventor, which is incorporated herein in its entirety by this reference, discloses a "Panoramic Indexing Camera Mount" that facilitates the photography process.

Once taken, the photographs are developed and digitized, then scanned into a computer. There, the stitching software aligns successive photographs and removes any visible seams, thus creating a continuous panoramic image.

Foreground images in virtual reality applications are constructed by a different but related process. Whereas the panorama is represented by a sphere or ring of inwardly displayed images that surround the viewer's virtual space location, foreground images are represented by a sphere of outwardly directed images of objects. The viewer may move around the objects within the virtual space and virtually manipulate those objects.

SUMMARY OF THE INVENTION

The present invention concerns an object photographer and method that enable the capture of images of an object. In particular the invention is directed to a device and method in which a camera is rotated around the object while maintaining the proper orientation to the object to enable the later electronic reconstruction of the captured images.

In general according to one aspect, the invention features an object photographer in which an object stand rotates an object to be photographed and a camera frame supports a camera to swing through an arc around the object. The camera may be a common chemical film type device. Alternatively, an electronic or digital camcorder type cameras may also be used. With these later-mentioned devices, the images may be directly, electronically loaded into a computer where they are placed in an array, arranged and aligned.

In specific embodiments, the height of the object stand is adjustable. This enables the object to be placed to coincide with an axis of rotation of the camera frame. Further, the camera is preferably mounted on an adjustable bracket to enable adjustments in the height of the camera relative to the camera frame. Thus, the optical axis of the camera may be positioned to extend through the axis of rotation of the camera frame.

In further aspects of the embodiments, at least one counter weight mechanism is used to balance the camera frame. To provide for smooth, effortless pivoting of the camera frame, the counterweight mechanism preferably enables adjustment of a location of a center of gravity of the camera frame both horizontally and vertically so that the center of gravity may be located on an axis of rotation of the camera frame.

In some embodiments, a stand motor is used to stepwise rotate the object stand between photographs, and another motor is used to drive the camera frame. Alternatively, click-stop mechanisms may be used to facilitate the stepwise manual rotation of the object stand and the pivoting of the camera frame.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. Of the drawings.

DETAILED DESCRIPTION OF THE PREFERRED EMBODIMENTS

Figure 1:
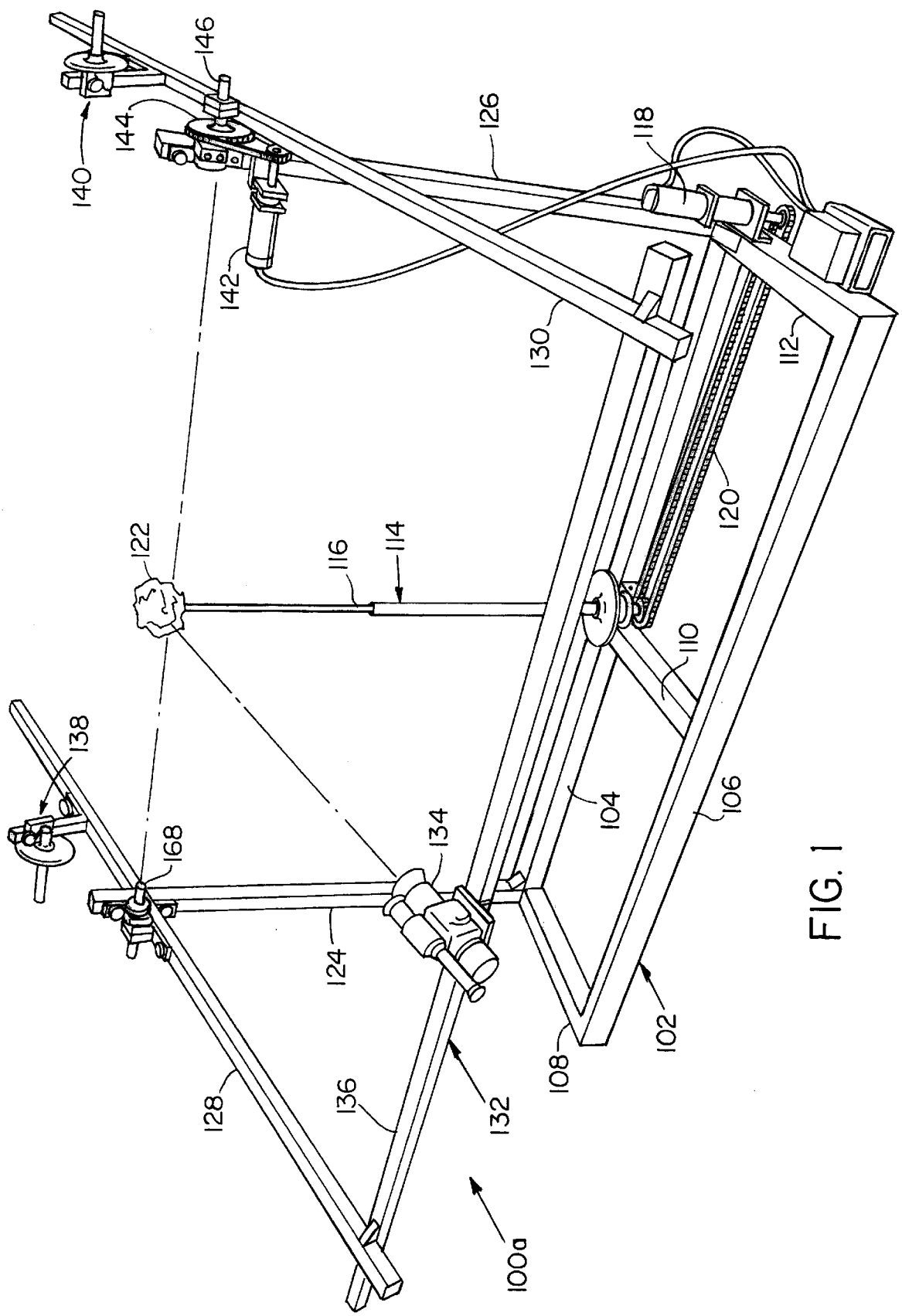
FIG. 1 is a perspective view of a first embodiment of an object photographer of the present invention.

FIG. 1 shows a first embodiment for studio use of an object photographer, which has been constructed according to the principles of the present invention. The object photographer 100a comprises a base frame 102, which comprises 1) a center longitudinal member 104, 2) a front longitudinal member 106 that extends parallel to the center member, and 3) three transverse members 108,110,112 that connect the center and front members. These components form a rigid base for the object photographer 100a.

An object stand 114 extends vertically from the center member 110 near its midpoint. The object stand 114 includes a telescopic shaft 116 that is journaled to the center member. The telescopic shaft 116 is driven at its lower end by a servo or stepper motor 118 via a stand drive-chain 120. The object 122 to be photographed is held on the top end of the telescopic shaft 116.

Right and left posts 124,126 extend vertically from the base 102, attaching at the end points of the center member 104. The right and left posts, the telescopic shaft and the center member are all essentially in the same vertical plane.

The left and right vertical posts 124,126 respectively support left and right swing arms 128,130 that can pivot through 180° or more. The left and right swing arms form part of a camera frame 132 that holds a camera 134 on a proximally located cross bar 136 and has counter weight mechanisms 138,140 for the camera at the respective distal ends of the swing arms 128,130. The camera frame 132 is driven by a camera frame stepper or servo motor 142 which drives a sprocket 144 connected to an axle 146 supporting the right swing arm 130. A swing arm drive-chain 148 connects the motor 142 to the sprocket 144.

Figure 2:
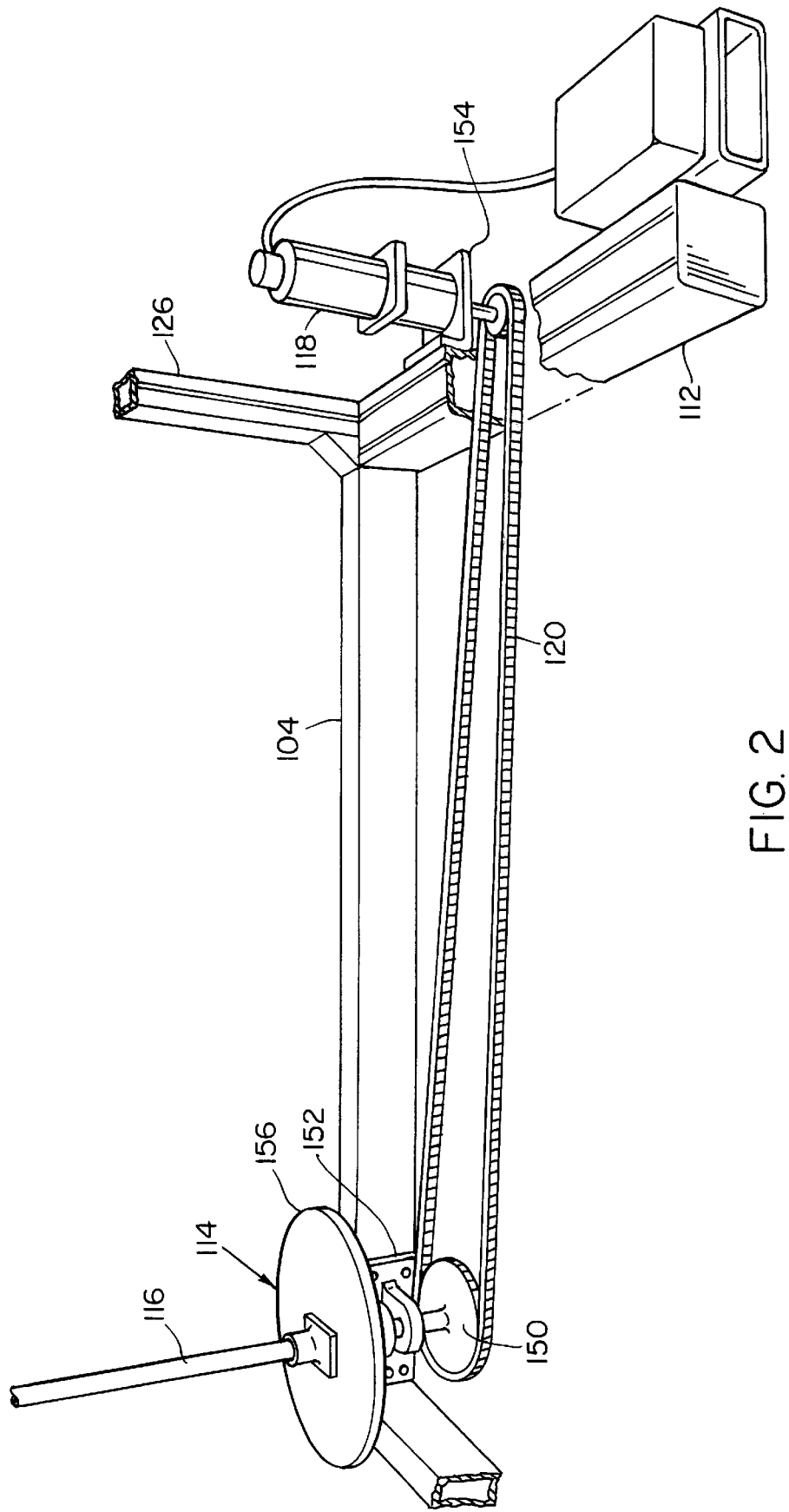
FIG. 2 is a more detailed perspective view of a drive mechanism for the first embodiment object photographer.

FIG. 2 is a more detailed perspective view of the drive mechanism for the object stand 114. As discussed previously, the stand motor 118 drives the object stand via the stand drive-chain 120. Specifically, a stand sprocket 150 is fixed to a bottom end of the telescopic shaft 116 and rigidly connected to it. The telescopic shaft 116 is journaled to the base frame 102, specifically to a stand bracket 152 that is bolted to the center member 104. The stand motor 118 is connected to the frame via a motor bracket 154 off of the third transverse member 112. A circular cover plate 156 is connected to the telescoping shaft 116 and is located above the stand bracket 152. Degree markings may be inscribed on this plate to provide a reference as the object stand 116 rotates.

Figure 3:
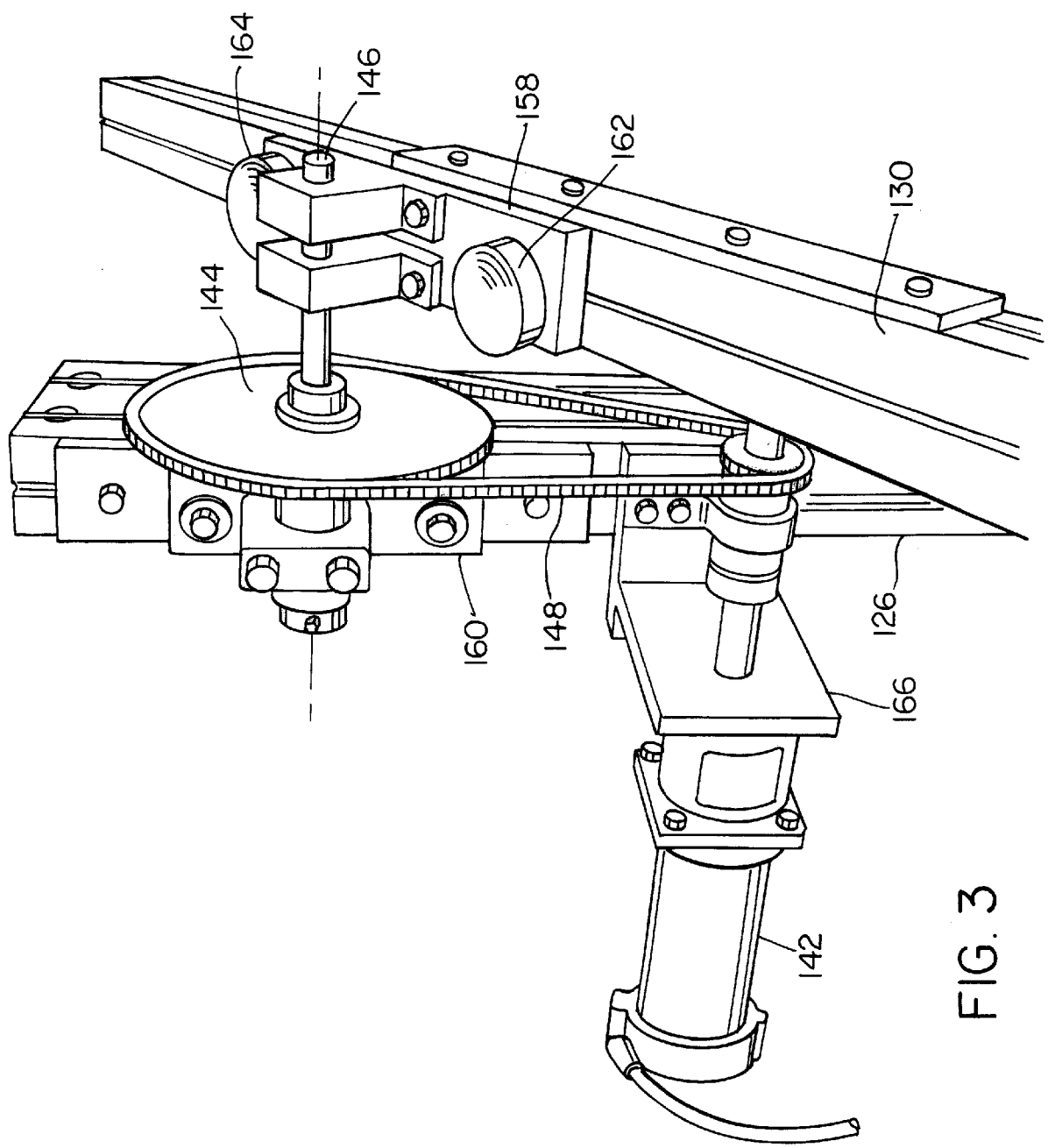
FIG. 3 is a detailed perspective view of the drive mechanism for the camera frame of the first embodiment.

FIG. 3 is a more detailed perspective view of the drive mechanism for the camera frame 132. The right swing arm axle 146 is journaled to the right vertical post 126 via a right post bracket 160. The swing arm axle 146 extends outwardly to rigidly connect to the right swing arm 130 via a right swing arm bracket 158 which bolts to a connecting channel on the right swing arm using knobs 162,164. The swing arm sprocket 144 is rigidly connected to the swing arm axle 146 and the swing arm drive-chain 148 passes over this sprocket to a drive shaft of the swing arm motor 142. The swing arm motor connects via a motor bracket 166 to the right vertical post 126.

Figure 4:
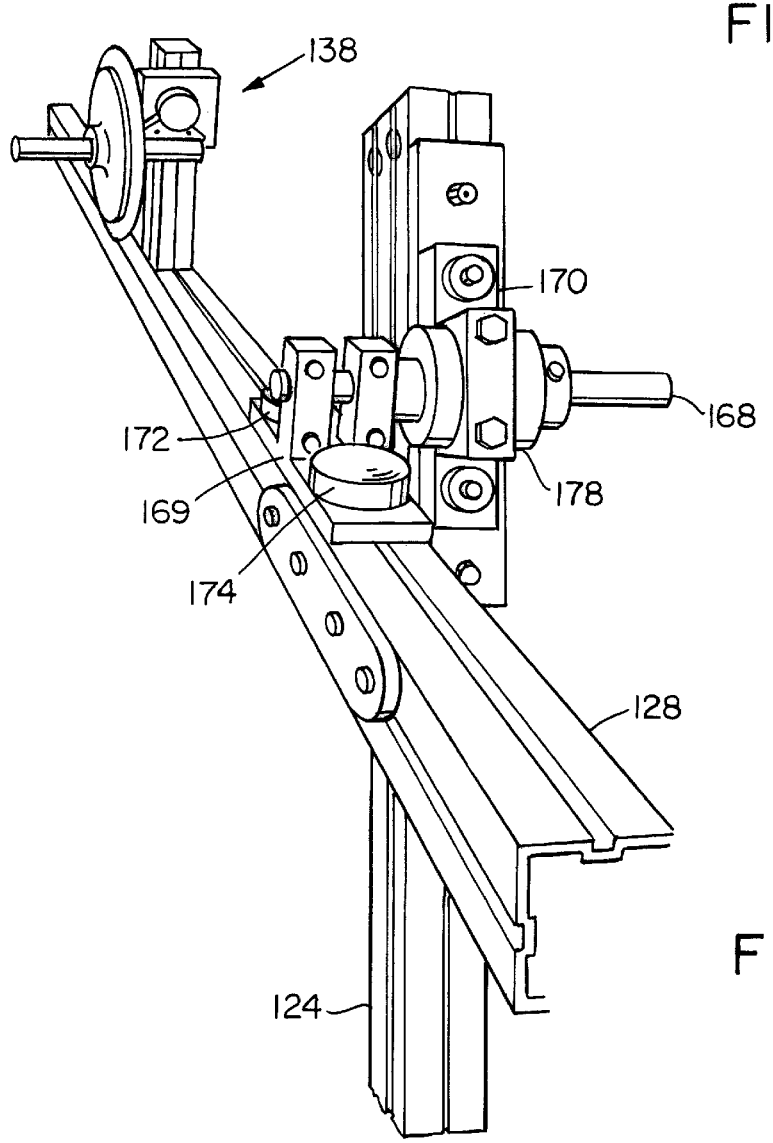
FIG. 4 is a perspective view showing the connection between the left swing arm and the left vertical post.

FIG. 4 is a detailed perspective view showing the attachment of the left swing arm 128 to the left vertical post 124. As in the right side, a left swing arm axle 168 is journaled to a left post bracket 178 that is bolted to the left post 124. The swing arm axle 168 is rigidly attached to the swing arm 128, specifically a left swing arm bracket 169 which is bolted into a rail on the swing arm via hand-tightened bolts 172,174.

Figure 5:
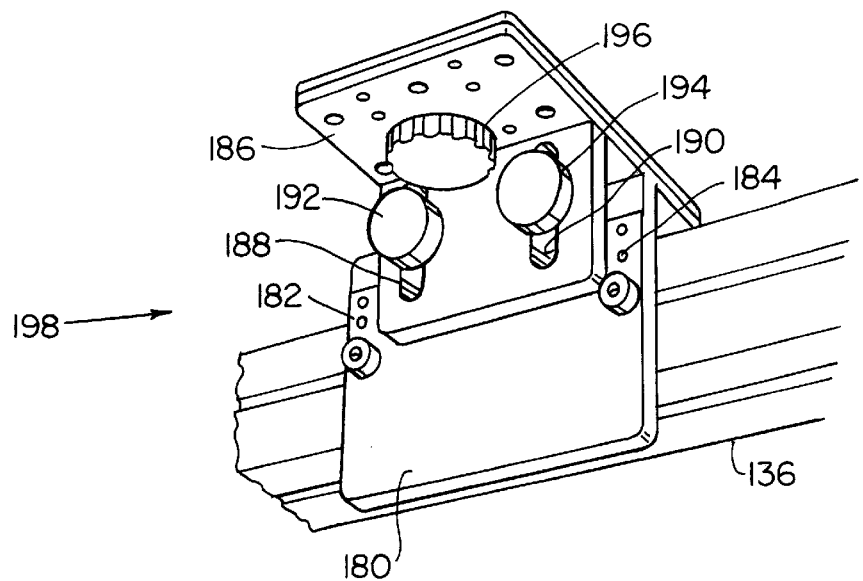
FIG. 5 is a perspective view of the camera bracket for supporting a camera on the camera frame.

FIG. 5 shows a camera bracket 198 that supports the camera 134 (not shown in this figure) on the transverse arm 136 of the camera frame 132. An adjustable attachment plate 180 has two vertical sets of three holes 182,184 on its left and right sides. Two Allen bolts pass through a corresponding pair of the holes and engage square nuts (not shown) held in the connecting channel of the transverse arm 136. Depending on which pair of holes is used, the height of the camera 134 can be grossly adjusted. A t-shaped or L-shaped bracket 186 has two longitudinal slots 188,190 on its right and left sides. Two hand-tightened bolts 192,194 pass through these slots and engage threads on the attachment plate 180 to provide for the fine adjustment of the camera height. Cameras are connected to the bracket 186 via another bolt 196 that engages a universal thread in the base of the camera.

Returning to FIG. 1, the object to be photographed is ideally located at the center of the series of photographs that are later electronically stitched together. This requirement is achieved by a number of adjustment mechanisms. First, the center of the object is located on the axis of rotation of the camera frame 132, which extends between two swing arm axles 146,168. This requirement is achieved by vertically setting the height of the object 122 by adjusting the telescopic shaft 116. Next, the height of the camera 134 on the camera frame 132 must be adjusted so that its optical axis also extends through the object's center camera frame axis. This is achieved by vertically adjusting the camera bracket 198. First, the height of the camera is grossly vertically set by selecting a pair of holes 182,184 to bolt the attachment plate 180 to the transverse arm 136. Then, the camera's height is finely tuned by loosening the two bolts 192, 194, properly positioning the camera 134, and then retightening the bolts 192,194. Once these adjustments are complete, the resulting photographs of the object will have the proper perspective with respect to each other.

Figure 6:
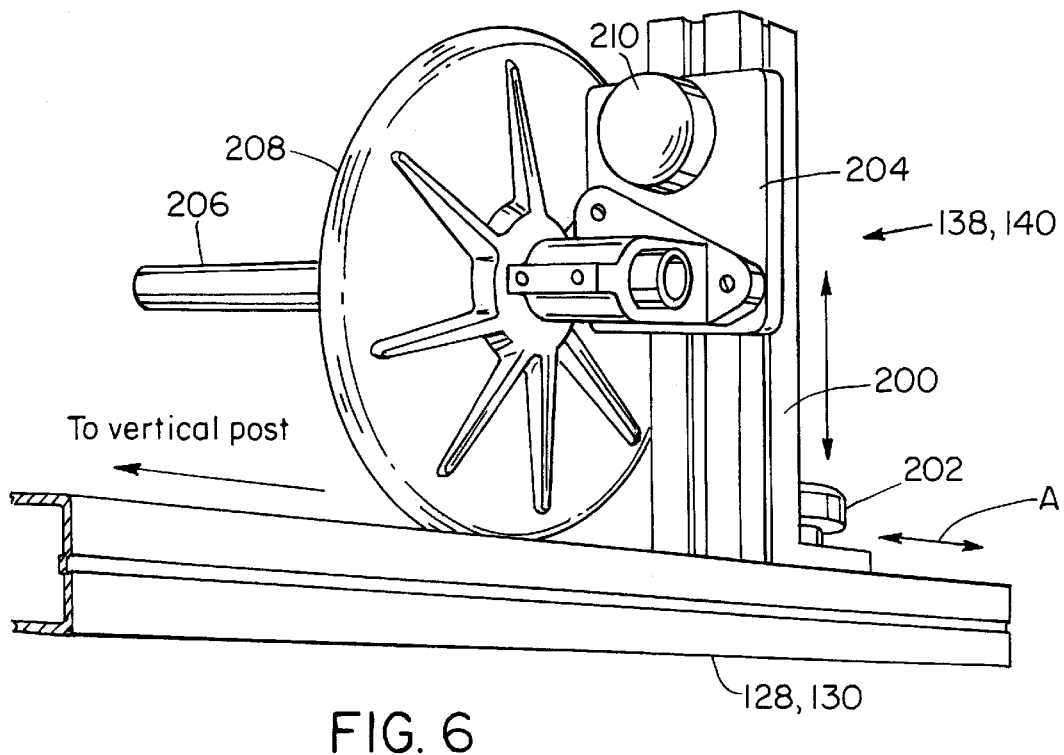
FIG. 6 is perspective view of an exemplary counterweight mechanism.

FIG. 6 shows the counter weight mechanisms 138,140 that is located at the respective distal ends of both the right and left swing arms 128,130. Specifically, a counter weight post 200 extends orthogonally away from the swing arm 128,130. It is bolted to the swing arm via a hand-tightened bolt 202. This makes it adjustable along the length of the swing arm 128,130 as represented by the arrows A. A counter weight bracket 204 rigidly supports a counter weight bar 206 on which counter weights or dumbbells may be loaded. The counter weight bracket 204 is adjustable along the length of the counter weight post 200 by another hand-tightened bolt 210. By adjusting the position of the counterweight post 200 on the swing arm 128,130 and by adjusting the height of the counter weight 208 above the swing arm via the counterweight bracket 204, the location of the counterweight can be adjusted in a two dimensional plane extending vertically through the swing arm 128,130.

The two dimensional adjustment of the counterweights for the right and left swing arms 128,130 is necessary to provide for the smooth pivoting of the camera frame 132. The camera frame 132 is ideally balanced so that it can be swung through its operational arc by the swing arm motor 142 by only controlling its inertia, and not supporting any of the frame's actual mass. This is achieved when the net center of gravity for the camera frame 132, including the camera 138 and counterweights 208, is located on the frame's axis of rotation that extends between the right and left swing arm axles 146,168.

The proper location of the center of gravity is achieved by adjusting the counter weight mechanisms 138,140 of the present invention according to the following process. First the camera frame 132 is placed in the horizontal position so that the swing arms 128,130 are also horizontal. The right and left counterweight posts 200 are then adjusted on the swing arms 128,130 so that they balance the frame. This locates the center of gravity in a plane that extends vertically through the frame's axis of rotation. The height of the center of gravity is then adjusted vertically in this plane so that it coincides with the frame's axis of rotation by adjusting the heights of the weights on the weight posts 200. This is accomplished by pivoting the swing arms out of horizontal, such as at 45° either above or below horizontal. The height of the counter weights 208 on the posts 200 is then adjusted so that the camera frame is again balanced. Once this protocol is performed, the swing arm can he rotated through its entire operational arc by the swing arm motor 142 without the requirement that the motor support the weight of the camera frame 132. The swing arm motor only needs to compensate for the camera frame's inertia.

Figure 7:
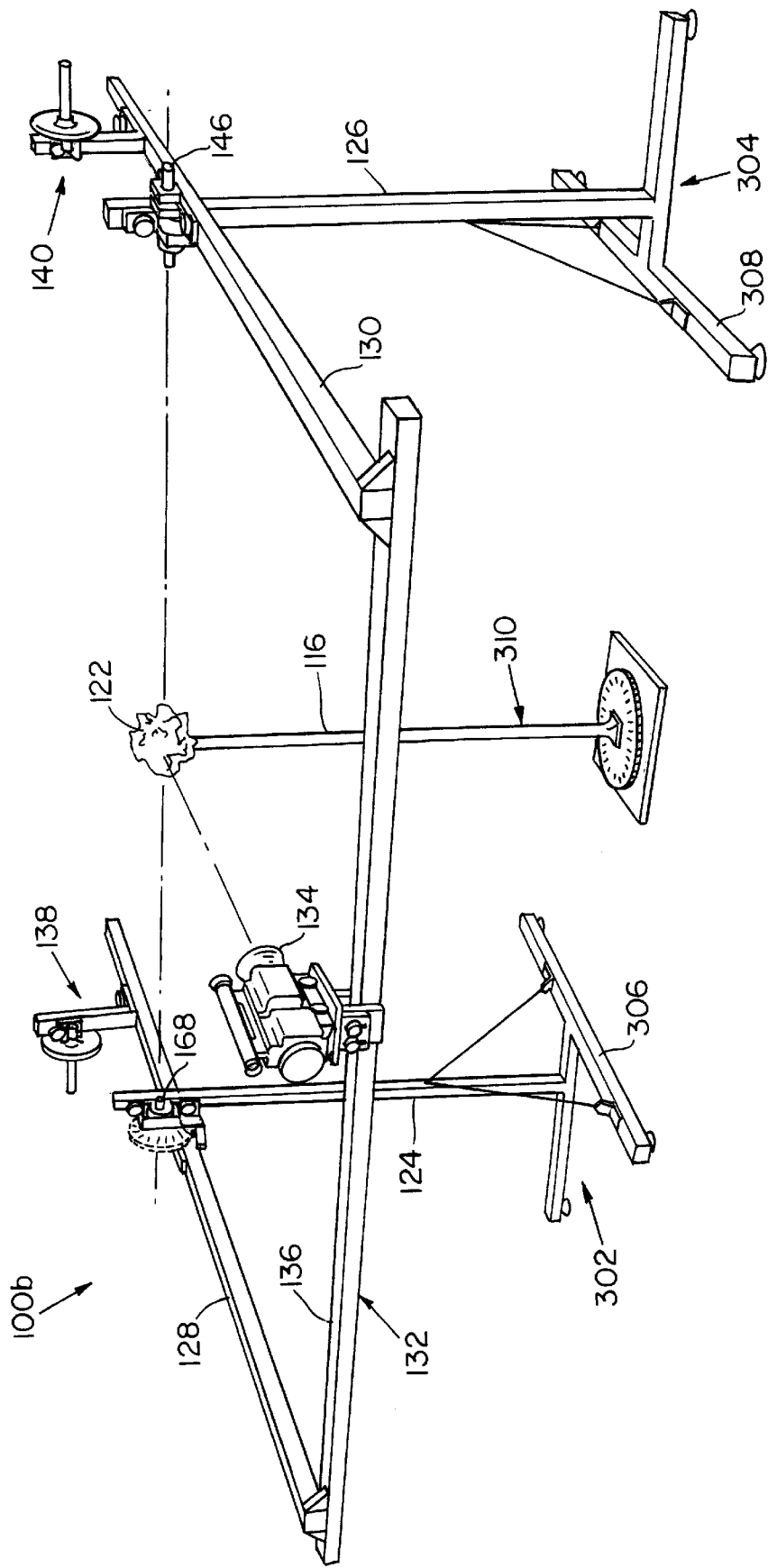
FIG. 7 is a perspective view of a second embodiment of the present invention.

FIG. 7 is a perspective view of a second embodiment 100*b* of the present invention which is designed for portability. This embodiment is more easily set up on-site without the requirement that the object be moved to the studio. Generally, components that are the same as the first embodiment have been given similar reference numerals.

Portability is facilitated by a number of different aspects. First, there is no base frame that extends between the right and left vertical posts 124,126. This feature allows the second embodiment to be positioned around the object without the requirement that the object be removed from its position. In fact, the second embodiment could be moved stepwise around a very large unmovable object. Secondly, motors are not used to drive the object stand and the camera frame. Instead, click-stop mechanisms are used. This feature reduces weight and complexity.

The right and left posts 124,126 are supported on respective right and left stands 302,304. The right and left stands 302,304 each comprise two members in a t-configuration. Guidewires extend from the transverse members 306,308 to the posts 124,126 to provide rigidity.

Figure 8:
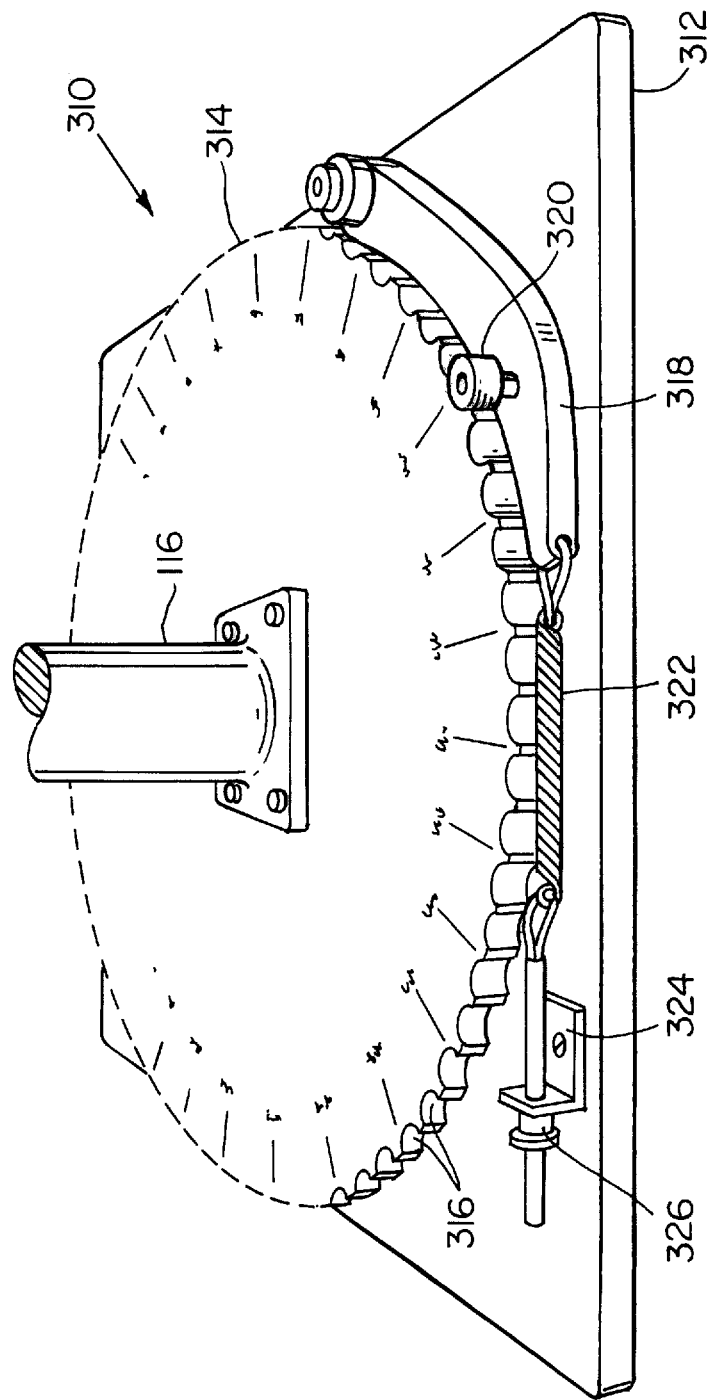
FIG. 8 is a perspective view showing the base portion of the object stand of the second embodiment.

FIG. 8 shows the base portion of the object stand 310. It comprises a base plate 312 that sits on a floor surface. A stand detent disk 314 is journaled to the base plate 312. The detent disk 314 has detents 316 formed on its entire outer circumferences at 5° increments. A lever arm 318 is pivotally attached to the base plate 312 and comprises a roller bearing 320 that is adapted to engage the detents 316 on the disk 314. The roller bearing and lever arm are biased toward the detent disk 314 via a spring 322 attached at a proximal end of the lever arm and secured to the base plate by bracket 324. A mechanism 326 is provided for adjusting the tension of the spring 322. Through this construction, the telescoping shaft 116 of the object stand may be rotated through 360° at 5° increments. At every 5°, the action of the roller bearing 320 on the detents 316 of the disk 314 provides increased resistance to the further rotation of the shaft 116.

Figure 9:
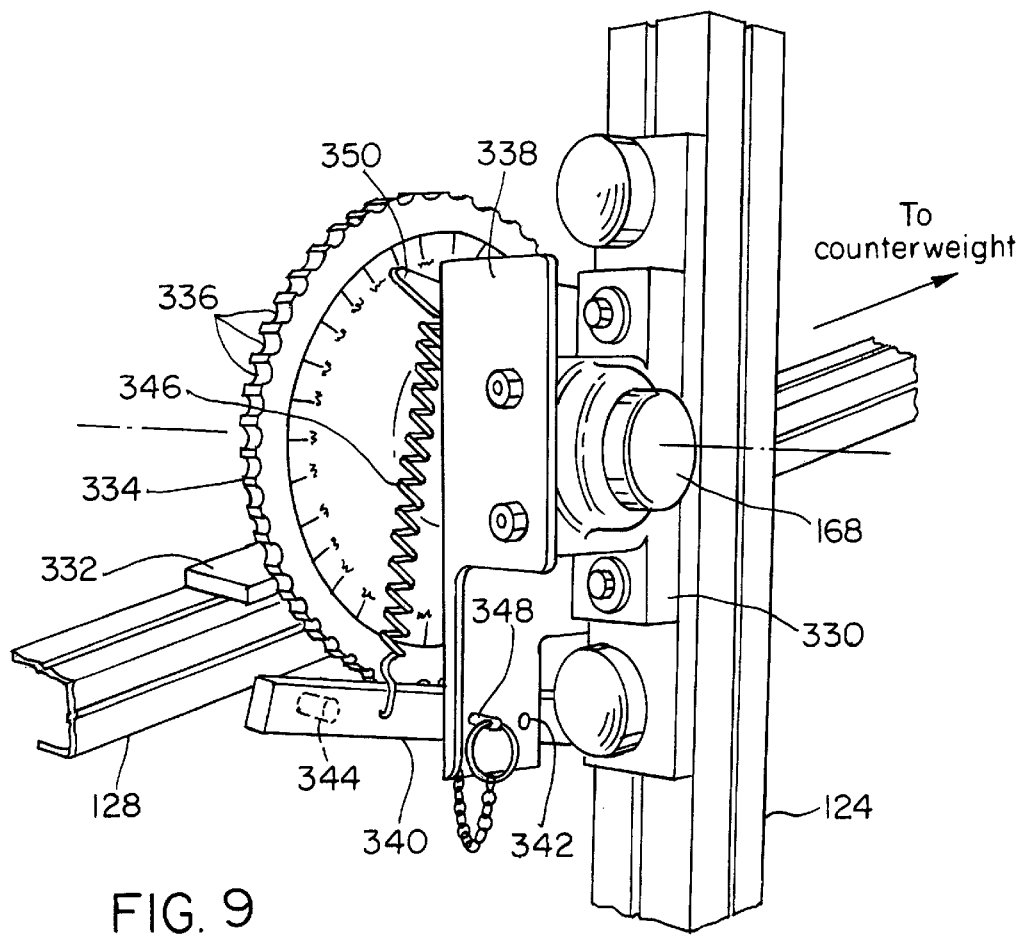
FIG. 9 is a perspective view showing the click-stop mechanism for the swing arm of the second embodiment.

FIG. 9 shows the click-stop mechanism that is used to control the angle of the camera frame 132 relative to the object 122. Similar to the first embodiment, a swing arm axle 168 is journaled to a post bracket 330 that is bolted to the left vertical post 124. The distal end of the swing arm axle 168 is rigidly coupled to a swing arm bracket 332 that is secured to the swing arm 128. A swing arm detent plate 334 is rigidly attached to the swing arm axle 168. As in the object stand detent plate, it has a plurality of detents 336 formed around its outer circumference at 5° increments. A lever arm support bracket 338 is rigidly attached to the post bracket 330. At its lower end, a second lever arm 340 is pivotally attached to the lever arm support bracket 338 via pin 342. At the proximal end of the lever arm, a roller bearing 344 is positioned to ride along the outer circumference of the swing arm detent disk 334 and engage the detents 336. The lever arm 340 is biased against the detent disk 334 via a spring 346 that extends between the lever arm 340 and a top end of the lever arm support bracket 338. During set-up and counter weight adjustment, the roller bearing 344 of the lever arm 340 may be held out of engagement with the swing arm detent disk 334 via an insertable pin 348 that passes through the lever arm support bracket 338 and engages a hole (not shown) in the lever arm 240. Finally, an indicating finger 350 is rigidly attached to the lever arm support bracket 338 and extends along the top surface of the detent plate 334 to indicate angular position.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

What is claimed is:

1. An object photographer, comprising:
   an object stand which can rotate an object to be photographed; and
   a camera frame which is adapted to support a camera and swing the camera through an arc around the object; and
   a frame motor which stepwise pivots the camera frame between photographs.

2. The object photographer described in claim 1, wherein a height of the object stand is adjustable to enable the object to be placed to coincide with an axis of rotation of the camera frame.

3. The object photographer described in claim 1, further comprising a camera bracket for attaching the camera to the camera frame; the camera bracket being adjustable to enable a height adjustment of the camera relative to the camera frame so that an optical axis of the camera extends through an axis of rotation of the camera frame.

4. The object photographer described in claim 1, further comprising at least one counter weight mechanism which balances the camera frame.

5. The object photographer described in claim 4, wherein the counterweight mechanism enables adjustment of a location of a center of gravity of the camera frame and attached camera both horizontally and vertically so that the center of gravity may be located on an axis of rotation of the camera frame.

6. The object photographer described in claim 4, wherein each counterweight mechanism comprises:
   a counterweight post that extends perpendicularly from the camera frame and is adjustable along a length of the camera frame; and
   a counterweight support bracket that enables the adjustment of the location of the counterweight on the counterweight post.

7. The object photographer described in claim 1, further comprising a stand motor which stepwise rotates the object stand between photographs.

8. The object photographer described in claim 7, wherein the stand motor is connected to a sprocket on the object stand via a drive-chain.

9. The object photographer described in claim 1, wherein the frame motor is connected to a sprocket on an axle of the camera frame.

10. An object photograph, comprises:

a camera frame which is adapted to support a camera and swing the camera through an arc around an object to be photographed; and a counterweight mechanism that enables adjustments of a location of a center of gravity of the camera frame and attached camera both horizontally and vertically so that the center of gravity may be located on an axis of rotation of the camera frame.

11. The object photographer described in claim 10, further comprising a frame click-stop mechanism which enables stepwise manual pivoting movement of the camera frame between photographs.

12. The object photographer described in claim 10, wherein the counterweight mechanism comprises:

a counterweight post that extends perpendicularly from the camera frame and is adjustable along a length of the camera frame; and a counterweight support bracket that enables the adjustment of the location of the counterweight on the counterweight post.

13. The object photographer described in claim 10, further comprising a camera bracket for attaching the camera to the camera frame; the camera bracket being adjustable to enable a height adjustment of the camera relative to the camera frame so that an optical axis of the camera may be adjusted to extend through an axis of rotation of the camera frame.

14. The object photographer described in claim 10, further comprising a frame motor which stepwise pivots the camera frame between photographs.

15. The object photographer described in claim 14, wherein the frame motor is connected to a sprocket on an axle of the camera frame.

16. The object photographer described in claim 10, further comprising a frame click-stop mechanism which enables stepwise manual pivoting movement of the camera frame between photographs.

17. The object photographer described in claim 16, wherein the frame click-stop mechanism comprises a detent disk and lever arm.

18. The object photographer described in claim 10, further comprising an object stand which can rotate an object to be photographed.

19. The object photographer described in claim 18, further comprising a stand click-stop mechanism which enables stepwise manual rotation of the object stand between photographs.

20. The object photograph in claim 19, wherein the stand click-stop mechanism comprises a detent disk and lever arm.

21. An object photography method, comprising:

adjusting at least one counter weight so that a camera frame holding a camera is balanced at a horizontal position;

pivoting the camera frame away from horizontal;

adjusting the at least one counter weight so that the camera frame is again balanced; and swinging the camera through an arc around an object to be photographed and photographing the object to generate a series of photographs.

22. The object photography method described in claim 21, further comprising:

rotating an object to be photographed.

23. The object photography method described in claim 21, further comprising adjusting a height of an object stand so that the object coincides with a pivoting axis of the camera.

24. The object photography method described in claim 21, further comprising adjusting the camera on the camera frame so that an optical axis of the camera extends through its pivoting axis.

\* \* \* \* \*

UNITED STATES PATENT AND TRADEMARK OFFICE
CERTIFICATE OF CORRECTION

PATENT NO. : 5,857,119
DATED : January 5, 1999
INVENTOR(S) : John Borden

It is certified that error appears in the above-identified patent and that said Letters Patent is hereby corrected as shown below:

In column 5, line 11, after "can" replace "he" with --be--.

In column 7, line 1, replace "photograph, comprises" with --photographer, comprising--.

In column 7, line 5, replace "adjustments" with --adjustment--.

In column 8, line 12, replace "photograph" with --photographer described--.

Signed and Sealed this

Eleventh Day of May, 1999

Attest:

Q. TODD DICKINSON

*Attesting Officer*  *Acting Commissioner of Patents and Trademarks*